United States Patent
Tsai (10) Patent No.: US 12,487,367 B2
(45) Date of Patent: Dec. 2, 2025

(54) METHOD AND APPARATUS FOR PERFORMING PILOT DETECTION BY JOINTLY CONSIDERING CORRELERATION RESULTS THAT ARE GENERATED FOR DIFFERENT SATELLITE SIGNALS

(71) Applicant: MEDIATEK INC., Hsin-Chu (TW)

(72) Inventor: Han-Wen Tsai, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 291 days.

(21) Appl. No.: 18/208,869

(22) Filed: Jun. 12, 2023

(65) Prior Publication Data

US 2023/0408704 A1 Dec. 21, 2023

Related U.S. Application Data

(60) Provisional application No. 63/352,334, filed on Jun. 15, 2022.

(51) Int. Cl.
  *G01S 19/30* (2010.01)
  *G01S 19/25* (2010.01)
  *G01S 19/33* (2010.01)

(52) U.S. Cl.
  CPC ............ *G01S 19/30* (2013.01); *G01S 19/256* (2013.01); *G01S 19/33* (2013.01)

(58) Field of Classification Search
  CPC ......... G01S 19/256; G01S 19/30; G01S 19/33
  USPC ........................................................ 375/150
  See application file for complete search history.

(56) References Cited

U.S. PATENT DOCUMENTS

2023/0152472 A1* 5/2023 Wang ...................... G01S 19/40
                                                 342/357.23

* cited by examiner

*Primary Examiner* — Dominic D Saltarelli
(74) *Attorney, Agent, or Firm* — Winston Hsu (57) ABSTRACT

A joint pilot detection method includes: obtaining a plurality of input signals that are derived from a plurality of satellite signals transmitted from a plurality of global navigation satellite system (GNSS) satellites, respectively, wherein each of the plurality of satellite signals carries a pilot component modulated by a secondary code; obtaining a plurality of code sequences that are replicas of secondary codes of the plurality of satellites, respectively; performing a plurality of correlation operations according to the plurality of input signals and the plurality of code sequences, for generating a plurality of correlation results, respectively; and performing pilot detection by jointly considering the plurality of correlation results.

20 Claims, 7 Drawing Sheets

METHOD AND APPARATUS FOR PERFORMING PILOT DETECTION BY JOINTLY CONSIDERING CORRELERATION RESULTS THAT ARE GENERATED FOR DIFFERENT SATELLITE SIGNALS

CROSS REFERENCE TO RELATED APPLICATIONS

This application claims the benefit of U.S. Provisional Application No. 63/352,334, filed on Jun. 15, 2022. The content of the application is incorporated herein by reference.

BACKGROUND

The present invention relates to pilot detection, and more particularly, to a method and apparatus for performing pilot detection by jointly considering correlation results that are generated for different satellite signals.

The global navigation satellite system (GNSS) is often described as an "invisible utility", and is so effective at delivering two essential services—time and position—accurately, reliably and cheaply that many aspects of the modern world have become dependent upon them. Each satellite of the GNSS is equipped with a highly precise atomic clock. When four or more satellites are in view, a GNSS receiver can measure the distance to each satellite by estimating the signal transmission time delay from the satellite to the receiver. From these measurements, a GNSS-embedded device can derive its own position and synchronize to the accurate GNSS system time.

Typically, a GNSS satellite signal is modulated by pseudo random noise (PRN) code. The PRN code is a code sequence with randomly distributed O's and 1's. Each satellite transmits a unique PRN code. Hence, the GNSS receiver identifies any of the satellites by its unique PRN code. The unique PRN code is continuously repeated. The GNSS receiver uses a local replica version of the satellite signal to correlate the received satellite signal. The purpose of the correlation process is to synchronize the timing between the local replica and the received satellite signal. Because the timing is unknown and dynamic, the received satellite PRN code sequence must be correlated with a plurality of its time-shifted versions if the satellite PRN code sequence is unknown, the GNSS receiver must try all the possible sequences.

To get accurate position fixes, the GNSS receiver tends to resolve accurate GNSS time as soon as possible. However, the legacy GPS L1 C/A and BeiDou B1I signals at least take 6-12 seconds for preamble detection and time information decoding, even if the clock information and ephemeris data are ready. For these reasons, the modernized GNSS signals, such as GPS L1C and BeiDou B1C, are made up of two different components, including a data component transmitted via an in-phase (I) channel and a pilot component transmitted via a quadrature (Q) channel. Not only does each satellite have unique spreading codes, but different codes are also used for the pilot component and the data component. In addition to the spreading code, the pilot component uses an 18-second secondary code (also called an overlay code) with 1800 bits (also called chips due to bearing no useful data information). That is, the pilot component is dataless but contains a known secondary code. The modernized GPS L1C and BeiDou B1C signals can enhance the performance of GNSS time acquisition. The long secondary codes of L1C and B1C on the pilot carrier were chosen to have very low minor auto-correlation and cross-correlation peaks, so a very short segment of the code can be used to establish its underlying code phase. Normally, a 100-chip segment of the received code with 1-second long is correlated over a replica of the entire secondary code, the proper correlation peak would be easily distinguished. In other words, the long L1C and B1C secondary code can be acquired reliably after only one or two seconds of signal lock.

Even with infrequent use, the GNSS receiver's crystal oscillator, which typically is better than 5 parts per million (ppm), should have sufficient accuracy—better than ±9 seconds—to completely resolve GPS or BeiDou time with one signal acquisition. In 24 hours with a clock frequency error of 5 ppm, the time drift would be less than second. Furthermore, the worst clock error with A-GNSS is ±2 seconds, which is adequate to completely resolve GPS or BeiDou time after acquiring only one L1C or B1C signal. This capability can aid acquisition of and navigation with other signals, such as L1C/A, B1I or signals from other GNSS providers. The 18-second secondary code will provide benefits as soon as even a few L1C or B1C signals are available.

However, the typical GNSS receiver design performs pilot detection by using one satellite signal. The pilot detection performance is degraded when a weak satellite signal is received. Thus, there is a need for an innovative pilot detection design which is capable of achieving fast and high-sensitivity time acquisition.

SUMMARY

One of the objectives of the claimed invention is to provide a method and apparatus for performing pilot detection by jointly considering correlation results that are generated for different satellite signals.

According to a first aspect of the present invention, an exemplary joint pilot detection method is disclosed. The exemplary joint pilot detection method includes: obtaining a plurality of input signals that are derived from a plurality of satellite signals transmitted from a plurality of global navigation satellite system (GNSS) satellites, respectively, wherein each of the plurality of satellite signals carries a pilot component modulated by a secondary code; obtaining a plurality of code sequences that are replicas of secondary codes of the plurality of satellites, respectively; performing a plurality of correlation operations according to the plurality of input signals and the plurality of code sequences, for generating a plurality of correlation results, respectively; and performing pilot detection by jointly considering the plurality of correlation results.

According to a second aspect of the present invention, an exemplary joint pilot detection apparatus is disclosed. The exemplary joint pilot detection apparatus includes a correlation circuit and a joint pilot detection circuit. The correlation circuit is arranged to obtain a plurality of input signals that are derived from a plurality of satellite signals transmitted from a plurality of global navigation satellite system (GNSS) satellites, respectively, wherein each of the plurality of satellite signals carries a pilot component modulated by a secondary code; obtain a plurality of code sequences that are replicas of secondary codes of the plurality of satellites, respectively; and perform a plurality of correlation operations according to the plurality of input signals and the plurality of code sequences, for generating a plurality of correlation results, respectively. The joint pilot detection circuit is arranged to perform pilot detection by jointly considering the plurality of correlation results.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
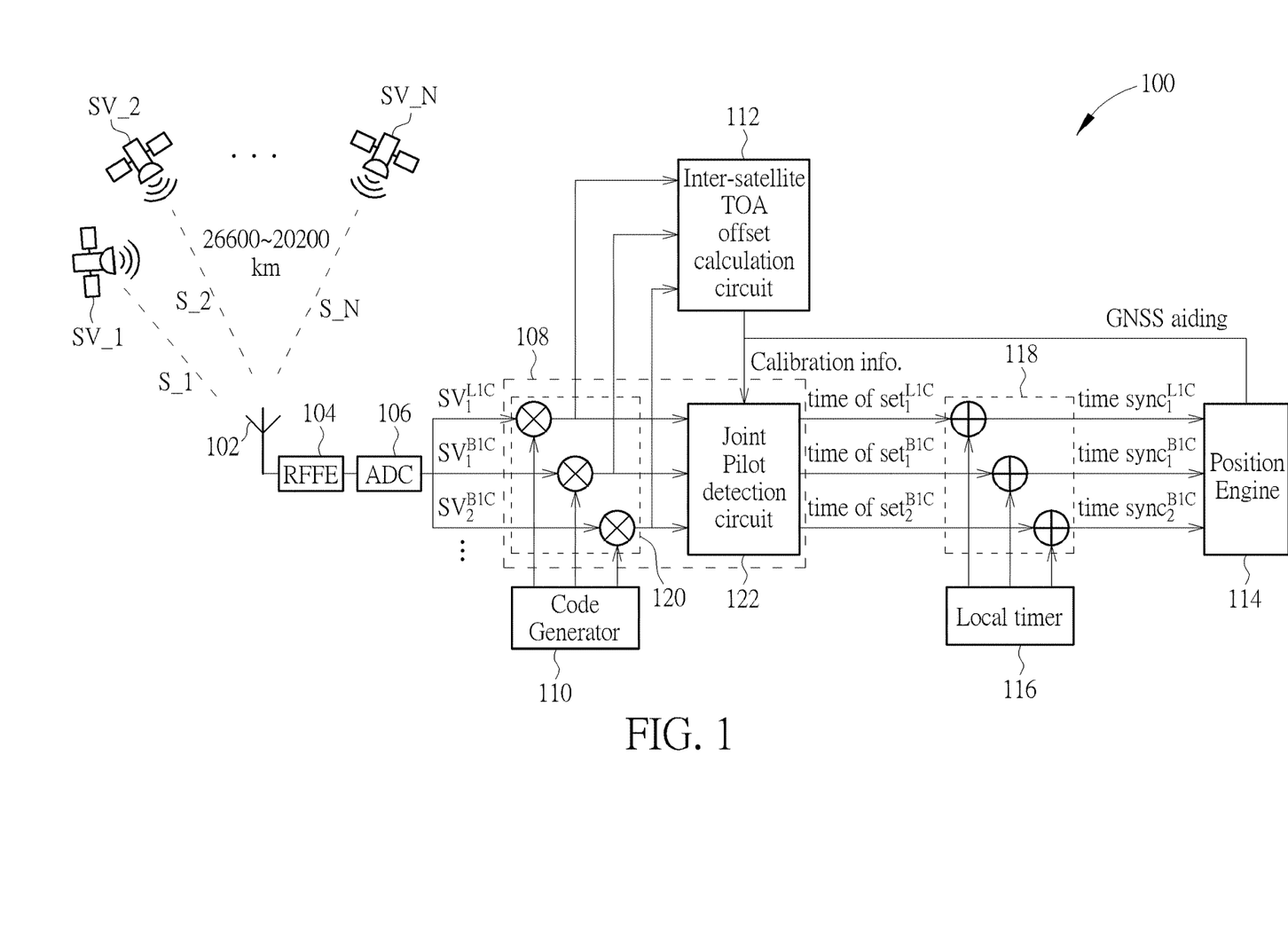
FIG. 1 is a diagram illustrating a GNSS receiver according to an embodiment of the present invention.

FIG. 1 is a diagram illustrating a GNSS receiver according to an embodiment of the present invention. The GNSS receiver 100 may include an antenna 102, a radio-frequency font-end (RFFE) 104, an analog-to-digital converter (ADC) 106, a joint pilot detection apparatus 108, a code generator 110, an inter-satellite time of arrival (TOA) offset calculation circuit 112, a position engine 114, a local timer 116, and a summation circuit 118. Suppose that there are multiple GNSS satellites SV_1, SV_2, . . . , SV_N (N≥2) visible to the GNSS receiver 100, where the GNSS satellites SV_1-SV_N (N≥2) may belong to the same GNSS system or different GNSS systems, and the GNSS satellites SV_1-SV_N (N≥2) are placed in orbits that are 26000-20200 kilometers (km) above the GNSS receiver 100. The GNSS receiver 100 receives a plurality of satellite signals S_1, S_2, . . . , S_N (N≥2) from the visible GNSS satellites SV_1-SV_N (N≥2), respectively. In this embodiment, each of the satellite signals S_1-S_N (N≥2) has a pilot component modulated by a secondary code (overlay code). For example, the satellite signals S_1-S_N (N≥2) may include two or more GPS L1C signals. For another example, the satellite signals S_1-S_N (N≥2) may include two or more BeiDou B1C signals. For yet another example, the satellite signals S_1-S_N (N≥2) may include at least one GPS L1C signal and at least one BeiDou B1C signal. To put it simply, the satellite signals S_1-S_N (N≥2) that are received and then jointly considered for pilot detection may include GPS L1C signals only, BeiDou B1C signals only, or a combination of GPS L1C signal (s) and BeiDou B1C signal (s).

With proper processing of the received satellite signals S_1-S_N (N≥2), a plurality of input signals are generated and provided to the joint pilot detection apparatus 108. For brevity and simplicity, only three input signals $$SV_1^{L1C}, SV_1^{B1C}, SV_2^{B1C}$$

are shown in FIG. 1, where the input signal $$SV_1^{L1C}$$

may be derived from the satellite signal S_N being a GPS L1C signal transmitted from a GPS satellite, the input signal $$SV_1^{B1C}$$

may be derived from the satellite signal S_2 being a BeiDou B1C signal transmitted from one BeiDou satellite, and the input signal $$SV_2^{B1C}$$

may be derived from the satellite signal S_1 being a BeiDou B1C signal transmitted from another BeiDou satellite. However, this is for illustrative purposes only, and is not meant to be a limitation of the present invention.

The joint pilot detection apparatus 108 includes a correlation circuit 120 and a joint pilot detection circuit 122. The correlation circuit 120 obtains the input signals (e.g., $$SV_1^{L1C}, SV_1^{B1C}, SV_2^{B1C})$$

derived from the satellite signals S_1-S_N (N≥2), and also obtains a plurality of code sequences generated from the code generator 110, where the code sequences (e.g., $$SV_{1,local}^{L1C}, SV_{1,local}^{B1C}, SV_{2,local}^{B1C})$$

are replicas of secondary codes (overlay codes) of the satellites SV_1-SV_N (N≥2), respectively. The correlation circuit 120 includes a plurality of correlators, each arranged to perform a correlation operation according to an input signal and a code sequence (which is a local replica of a secondary code unique to one satellite). Hence, the correlation circuit 120 performs a plurality of correlation operations according to the input signals and the code sequences, for generating a plurality of correlation results, respectively. For example, one correlation result is generated by correlating a 100-chip segment selected from the input signal $$SV_1^{L1C}$$

over a replica $$SV_{1,local}^{L1C}$$

of the entire secondary code of the satellite SV_N, another correlation result is generated by correlating a 100-chip segment selected from the input signal $$SV_1^{B1C}$$

over a replica $$SV_{1,locl}^{B1C}$$

of the entire secondary code of the satellite SV_2, and yet another correlation result is generated by correlating a 100-chip segment selected from the input signal $$SV_{2,local}^{B1C}$$

over a replica $$SV_{2,local}^{B1C}$$

of the entire secondary code of the satellite SV_1. In some embodiments of the present invention, the input signals (e.g., $$SV_1^{L1C}, SV_1^{B1C}, SV_2^{B1C})$$

may be pre-processed before being fed into the joint pilot detection apparatus 108 (particularly, correlation circuit 120 of joint pilot detection apparatus 108) for pilot detection. Regarding any of GPS L1C signal and BeiDou B1C signal, the pilot component is modulated by a primary code (spreading code) and a secondary code (overlay code). The input signals received by the joint pilot detection apparatus 108 (particularly, correlation circuit 120 of joint pilot detection apparatus 108) may be despreaded signals generated by using unique primary codes (spreading codes) of the satellites SV_1-SV_N (N≥2), respectively. However, this is for illustrative purposes only, and is not meant to be a limitation of the present invention.

After the correlation results generated based on the input signals (e.g., $$SV_1^{L1C}, SV_1^{B1C}, SV_2^{B1C})$$

and the code sequences (e.g., $$SV_{1,local}^{L1C}, SV_{1,local}^{B1C}, SV_{2,local}^{B1C})$$

are available to the joint pilot detection circuit 122, the joint pilot detection circuit 122 performs pilot detection (i.e., secondary code detection) by jointly considering the correlation results.

In this embodiment, the joint pilot detection apparatus 108 is arranged to synchronize the timing between the local replica of the secondary code and the received satellite signal. After the joint pilot detection circuit 122 detects a proper correlation peak that can pass the joint pilot detection strategy, the synchronization timing of the satellite signals (e.g., $$\text{time sync}_1^{L1C}, \text{time sync}_1^{B1C}, \text{time sync}_2^{B1C})$$

can be derived from the secondary code detection result (e.g., $$\text{time of set}_1^{L1C}, \text{time of set}_1^{B1C}, \text{time of set}_2^{B1C})$$

generated from the joint pilot detection circuit 122 and the local time information provided from the local timer 116, and then can be supplied to the position engine 114 that is used to deal with derivation of the position of the GNSS receiver 100. Since the present invention is focused on the joint pilot detection scheme, further details of other operations and functions of the GNSS receiver 100 are omitted here for brevity.

Figure 2:
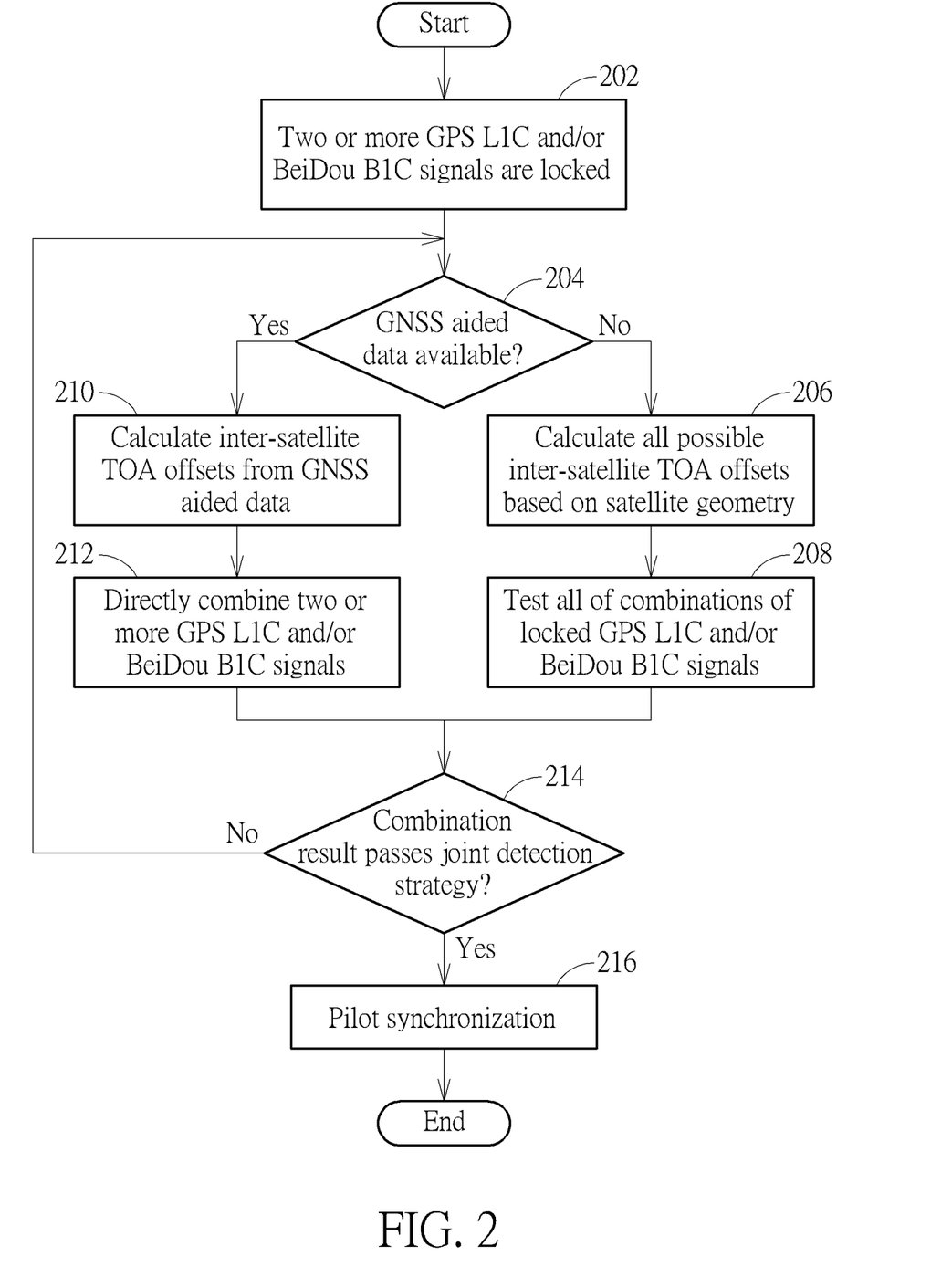
FIG. 2 is a flowchart illustrating a joint pilot detection method according to an embodiment of the present invention.

FIG. 2 is a flowchart illustrating a joint pilot detection method according to an embodiment of the present invention. After multiple satellite signals (e.g., two or more GPS L1C and/or BeiDou BIC signals) are locked by the GNSS receiver 100 (Step 202), the GNSS receiver 100 checks if GNSS aided data (initial location error <3 km and clock error <=2 sec) is available (Step 204). For example, the GNSS aided data may be available if the GNSS receiver 100 has acquired satellite-derived time and position before. For another example, the GNSS aided data may be available if the GNSS receiver 100 is in an assisted GNSS (A-GNSS) service area. To put it simply, the GNSS aided data can be obtained from an internal circuit component (e.g., position engine 114) of the GNSS receiver 100 or can be received from an external A-GNSS service provider (not shown).

Since multiple satellite signals are jointly considered for pilot detection, inter-satellite TOA offsets associated with the jointly considered satellite signals should also be considered for improving the pilot detection accuracy. Ina case where the GNSS aided data is not available (Step 204), the inter-satellite TOA offset calculation circuit 112 is enabled to calculate all possible inter-satellite TOA offsets based on the satellite geometry (Step 206). Next, the joint pilot detection apparatus 108 tests all of combinations of the locked GPS L1C and/or BeiDou B1C signals according to the possible inter-satellite TOA offsets calculated by the inter-satellite TOA offset calculation circuit 112 (Step 208). Since the GNSS satellites SV_1-SV_N (N≥2) are placed in orbits that are 26000-20200 km above the GNSS receiver 100, the maximum inter-satellite TOA offset is about 21 ms. Furthermore, the period of each chip of the secondary code is 10 ms. Hence, only a limited number of computations and tests are needed.

In another case where the GNSS aided data is available to the GNSS receiver 100, the GNSS aided data can provide reference satellite timing directly, and the joint pilot detection apparatus 108 can calculate the inter-satellite TOA offsets from the GNSS aided data (Step 210). Next, the joint pilot detection apparatus 108 directly combine the locked GPS L1C and/or BeiDou B1C signals for pilot detection (secondary code detection) (Step 212).

At step 214, the joint pilot detection apparatus 108 checks if the combination result derived from multiple locked satellite signals (e.g., two or more GPS L1C and/or BeiDou B1C signals) passes the joint detection strategy. If the combination result fails to pass the joint detection strategy, the flow returns to Step 204. If the combination result successfully passes the joint detection strategy, it is determined that timing of the local replica of the secondary code is synchronized with that of the received satellite signal (Step 216).

As mentioned above, the joint pilot detection apparatus 108 (particularly, joint pilot detection circuit 122 of joint pilot detection apparatus 108) performs pilot detection (secondary code detection) by jointly considering a plurality of correlation results derived from a plurality of satellite signals. For better comprehension of technical features of the proposed joint pilot detection scheme, several exemplary joint pilot detection circuit designs are described as below with reference to the accompanying drawings.

Figure 3:
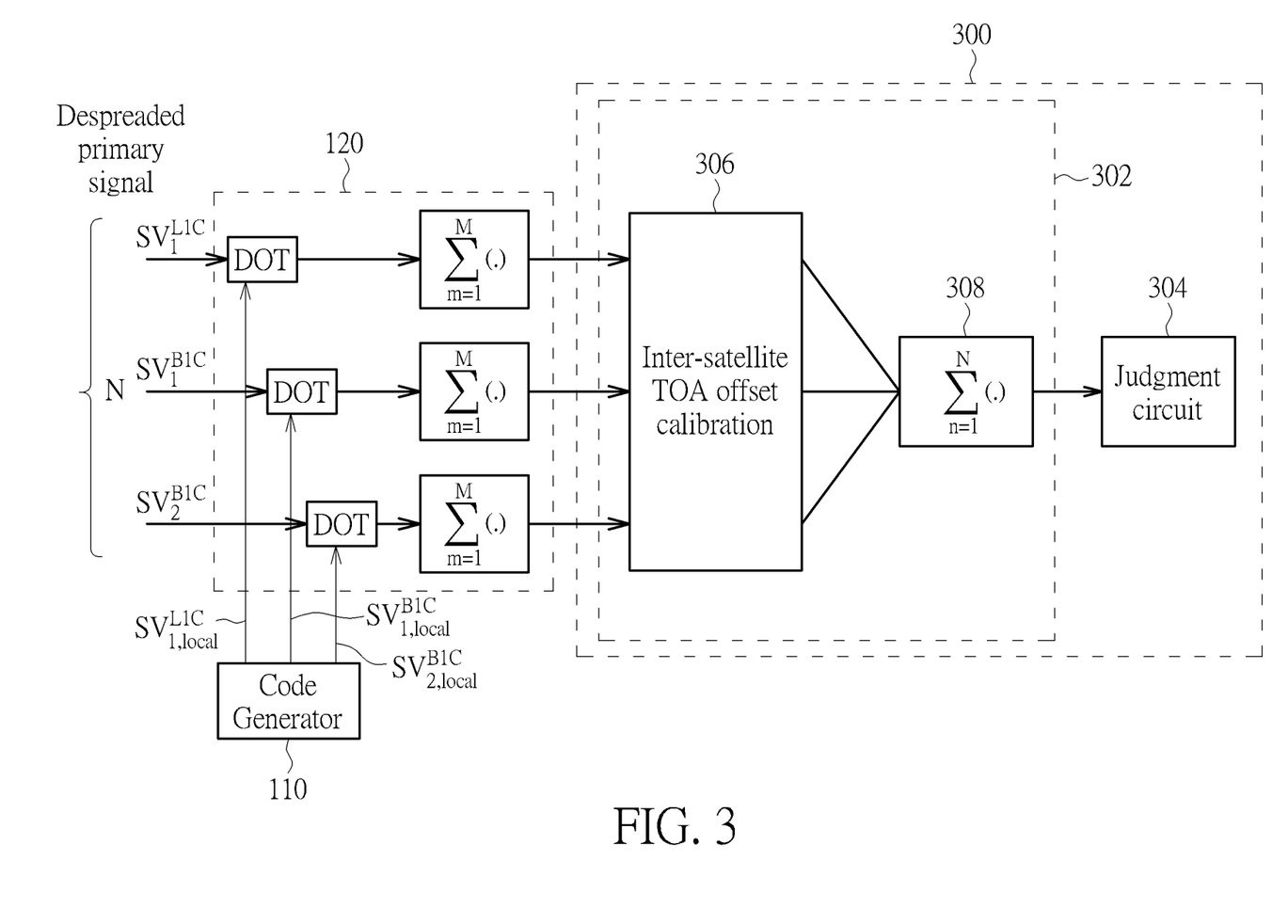
FIG. 3 is a diagram illustrating a first joint pilot detection circuit design according to an embodiment of the present invention.

FIG. 3 is a diagram illustrating a first joint pilot detection circuit design according to an embodiment of the present invention. The joint pilot detection circuit 122 shown in FIG. 1 may be implemented using the joint pilot detection circuit 300 shown in FIG. 3. In this embodiment, the joint pilot detection circuit 300 includes a combining circuit 302 and a judgment circuit 304. The combining circuit 302 is arranged to perform coherent combination according to N correlation results generated from the correlator circuit 120, to generate a combination result. For example, assuming that a replica of each secondary code has M bits/chips $SV_{local}[1], \ldots, SV_{local}[M]$, the correlation results may include $$\sum_{m=1}^{M} SV_1^{L1C} \cdot SV_{1,local}^{L1C}[m], \sum_{m=1}^{M} SV_1^{B1C} \cdot SV_{1,local}^{B1C}[m],$$

$$\text{and } \sum_{m=1}^{M} SV_2^{B1C} \cdot SV_{2,local}^{B1C}[m],$$

where a 100-chip segment of the received code with 1-second long is correlated over a replica of the entire secondary code. The judgment circuit 304 is arranged to perform the pilot detection according to the combination result that is an output of the combining circuit 302. In this embodiment, the combining circuit 302 includes an inter-satellite TOA offset calibration circuit (labeled by "inter-satellite TOA offset calibration") 306 and an accumulator circuit (labeled by "$\sum_{n=1}^{N}(\cdot)$")

308. The accumulator circuit 308 is arranged to generate and output the combination result to the judgment circuit 304. The inter-satellite TOA offset calibration circuit 306 is arranged to perform inter-satellite TOA offset calibration upon the correlation results (i.e., outputs of correlator circuit 120) before the accumulator circuit 308 combines the correlation results to generate the combination result. For example, the inter-satellite TOA offsets between satellite signals S_1-S_N (N≥2) received by the GNSS receiver 100 can be obtained from the inter-satellite TOA offset calculation circuit 112, or can be locally calculated at the inter-satellite TOA offset calibration circuit 306 based on the GNSS aided data (which may be provided from the position engine 114 of the GNSS receiver 100 or an A-GNSS service provider). It should be noted that the thick arrow symbol is indicative of a complex signal, and the thin arrow symbol is indicative of a real signal.

Figure 4:
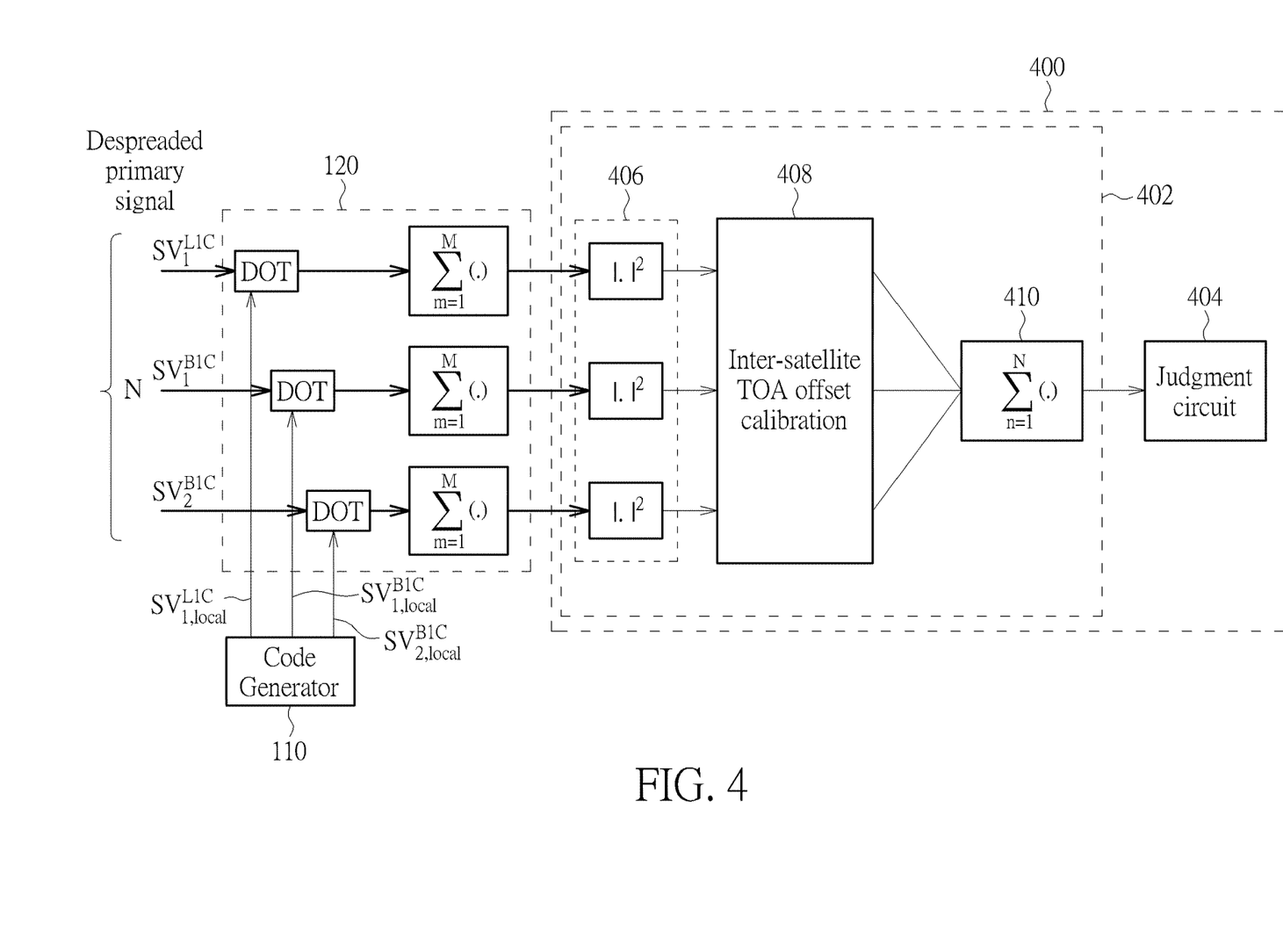
FIG. 4 is a diagram illustrating a second joint pilot detection circuit design according to an embodiment of the present invention.

FIG. 4 is a diagram illustrating a second joint pilot detection circuit design according to an embodiment of the present invention. The joint pilot detection circuit 122 shown in FIG. 1 may be implemented using the joint pilot detection circuit 400 shown in FIG. 4. In this embodiment, the joint pilot detection circuit 400 includes a combining circuit 402 and a judgment circuit 404. The combining circuit 402 is arranged to perform non-coherent combination according to N correlation results generated from the correlator circuit 120, to generate a combination result. For example, assuming that a replica of each secondary code has M bits/chips $SV_{local}[1], \ldots, SV_{local}[M]$, the correlation results may include $$\sum_{m=1}^{M} SV_1^{L1C} \cdot SV_{1,local}^{L1C}[m], \sum_{m=1}^{M} SV_1^{B1C} \cdot SV_{1,local}^{B1C}[m],$$

$$\text{and } \sum_{m=1}^{M} SV_2^{B1C} \cdot SV_{2,local}^{B1C}[m],$$

where a 100-chip segment of the received code with 1-second long is correlated over a replica of the entire secondary code. The judgment circuit 404 is arranged to perform the pilot detection according to the combination result that is an output of the combining circuit 402. In this embodiment, the combining circuit 402 includes a mathematical manipulation circuit 406 (which includes a plurality of mathematical manipulation operators labeled by "$|\cdot|^2$"), an inter-satellite TOA offset calibration circuit (labeled by "inter-satellite TOA offset calibration") 408 and an accumulator circuit (labeled by "$\sum_{n=1}^{N}(\cdot)$")

410. The mathematical manipulation circuit 406 is arranged to generate N mathematical manipulation values of N correlation results, respectively. For example, a mathematical manipulation value may be set by a squared magnitude of a correlation result (which is a complex value). Hence, the mathematical manipulation values may include $\left|\sum_{m=1}^{M} SV_1^{L1C} \cdot SV_{1,local}^{L1C}[m]\right|^2, \left|\sum_{m=1}^{M} SV_1^{B1C} \cdot SV_{1,local}^{B1C}[m]\right|^2,$ and $\left|\sum_{m=1}^{M} SV_2^{B1C} \cdot SV_{2,local}^{B1C}[m]\right|^2.$ The accumulator circuit 410 is arranged to generate and output the combination result to the judgment circuit 404. The inter-satellite TOA offset calibration circuit 408 is arranged to perform inter-satellite TOA offset calibration upon the mathematical manipulation values (i.e., outputs of mathematical manipulation circuit 406) before the accumulator circuit 410 combines the mathematical manipulation values to generate the combination result. For example, the inter-satellite TOA offsets between satellite signals S_1-S_N (N≥2) received by the GNSS receiver 100 can be obtained from the inter-satellite TOA offset calculation circuit 112, or can be locally calculated at the inter-satellite TOA offset calibration circuit 408 based on the GNSS aided data (which may be provided from the position engine 114 of the GNSS receiver 100 or an A-GNSS service provider). It should be noted that the thick arrow symbol is indicative of a complex signal, and the thin arrow symbol is indicative of a real signal.

Figure 5:
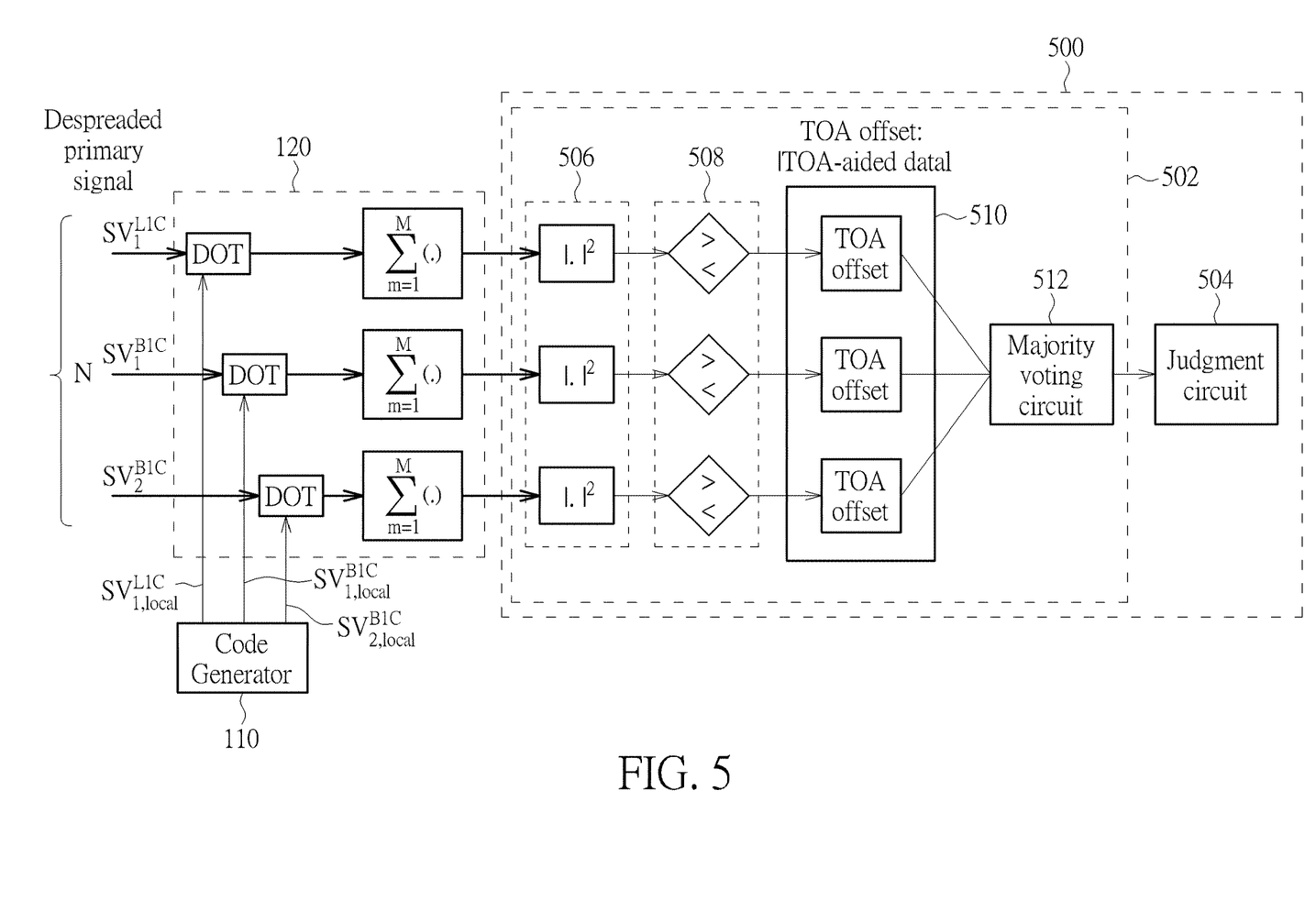
FIG. 5 is a diagram illustrating a third joint pilot detection circuit design according to an embodiment of the present invention.

FIG. 5 is a diagram illustrating a third joint pilot detection circuit design according to an embodiment of the present invention. The joint pilot detection circuit 122 shown in FIG. 1 may be implemented using the joint pilot detection circuit 500 shown in FIG. 5. In this embodiment, the joint pilot detection circuit 500 includes a processing circuit 502 and a judgment circuit 504. The processing circuit 502 is arranged to perform majority voting according to N correlation results generated from the correlator circuit 120, to generate a majority voting result. For example, assuming that a replica of each secondary code has M bits/chips $SV_{local}[1], \ldots, SV_{local}[M]$f the correlation results may include $\sum_{m=1}^{M} SV_1^{L1C} \cdot SV_{1,local}^{L1C}[m], \sum_{m=1}^{M} SV_1^{B1C} \cdot SV_{1,local}^{B1C}[m],$ and $\sum_{m=1}^{M} SV_2^{B1C} \cdot SV_{2,local}^{B1C}[m],$ where a 100-chip segment of the received code with 1-second long is correlated over a replica of the entire secondary code. The judgment circuit 504 is arranged to perform the pilot detection according to the majority voting result that is an output of the processing circuit 502. In this embodiment, the processing circuit 502 includes a mathematical manipulation circuit 506 (which includes a plurality of mathematical manipulation operators labeled by "$|\cdot|^2$"), a checking circuit 508 (which includes a plurality of checking operators labeled by "$\overset{>}{<}$"), an inter-satellite TOA offset calibration circuit (labeled by "inter-satellite TOA offset calibration") 510 and a majority voting circuit 512. The mathematical manipulation circuit 506 is arranged to generate N mathematical manipulation values of N correlation results, respectively. For example, a mathematical manipulation value may be set by a squared magnitude of a correlation result (which is a complex value). Hence, the mathematical manipulation values may include $\left|\sum_{m=1}^{M} SV_1^{L1C} \cdot SV_{1,local}^{L1C}[m]\right|^2, \left|\sum_{m=1}^{M} SV_1^{B1C} \cdot SV_{1,local}^{B1C}[m]\right|^2,$ and $\left|\sum_{m=1}^{M} SV_2^{B1C} \cdot SV_{2,local}^{B1C}[m]\right|^2.$ For each of the mathematical manipulation values output from the mathematical manipulation circuit 506, the checking circuit 508 is arranged to check if the mathematical manipulation value is larger than a predetermined threshold. If the mathematical manipulation value is not larger than the predetermined threshold, the checking circuit 508 discards the mathematical manipulation value without passing it to the following processing stage. If the mathematical manipulation value is larger than the predetermined threshold, the checking circuit 508 passes the mathematical manipulation value to the following processing stage for further processing. The majority voting circuit 512 is arranged to perform majority voting according to selected mathematical manipulation values, where each of the selected mathematical manipulation value is one of the mathematical manipulation values (which are outputs of the mathematical manipulation circuit 506) that is larger than the predetermined threshold. In addition, the inter-satellite TOA offset calibration circuit 510 is arranged to obtain GNSS aided data (which may be provided from the position engine 114 of the GNSS receiver 100 or an A-GNSS service provider), and further arranged to perform inter-satellite TOA offset calibration upon the selected mathematical manipulation values according to the GNSS aided data before the majority voting circuit 512 performs majority voting upon the selected mathematical manipulation values. Since the TOA of a satellite signal is known by the GNSS receiver 100 and the reference satellite time is provided by the GNSS aided data, computation of a TOA offset of the satellite signal can be simply expressed as |TOA−aided data|. It should be noted that the thick arrow symbol is indicative of a complex signal, and the thin arrow symbol is indicative of a real signal.

The proposed joint pilot detection method enables the GNSS receiver 100 to have fast and high-sensitivity time acquisition. Specifically, the proposed joint pilot detection method can resolve GPS or BeiDou time in less time than a conventional method that performs secondary code detection by using only one signal. Furthermore, the proposed joint pilot detection method takes the same amount of time to achieve better sensitivity than the conventional method.

Figure 6:
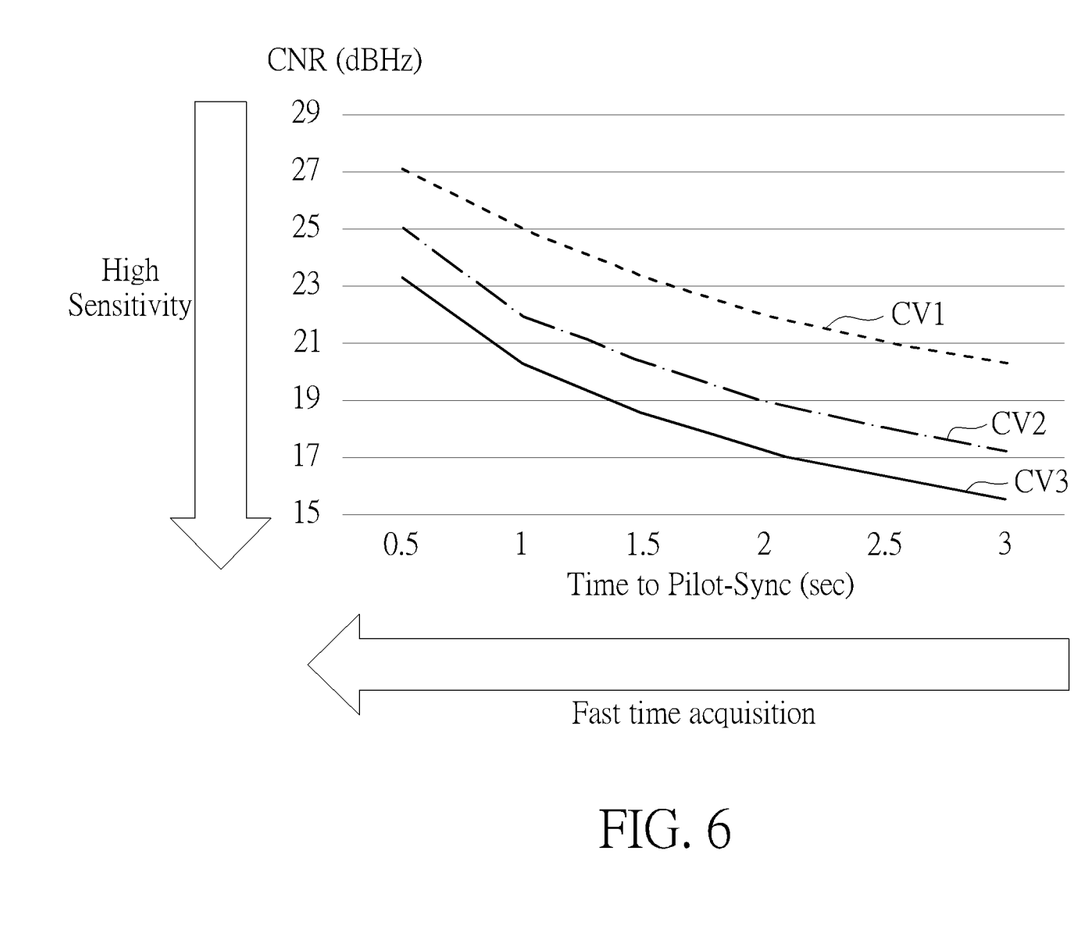
FIG. 6 is a diagram illustrating relationship between sensitivity and time to pilot-synchronization under 99% success rate for different secondary code detection conditions.

FIG. 6 is a diagram illustrating relationship between sensitivity and time to pilot-synchronization under 99% success rate for different secondary code detection conditions, where the X-axis is indicative of time to pilot-synchronization expressed in second, and the Y-axis is indicative of a carrier-to-noise ratio (CNR) expressed in decibel-Hertz (dbHz). The characteristic curve CV1 illustrates the relationship between sensitivity and time to pilot-synchronization under a condition that the secondary code detection is performed by using only one satellite signal according to the conventional method. The characteristic curve CV2 illustrates the relationship between sensitivity and time to pilot-synchronization under a condition that the secondary code detection is performed by jointly considering two satellite signals according the proposed joint pilot detection method. The characteristic curve CV3 illustrates the relationship between sensitivity and time to pilot-synchronization under a condition that the secondary code detection is performed by jointly considering three satellite signals according the proposed joint pilot detection method. As can be seen from FIG. 6, the proposed joint pilot detection method can achieve fast time acquisition as well as high sensitivity compared to the conventional method.

Figure 7:
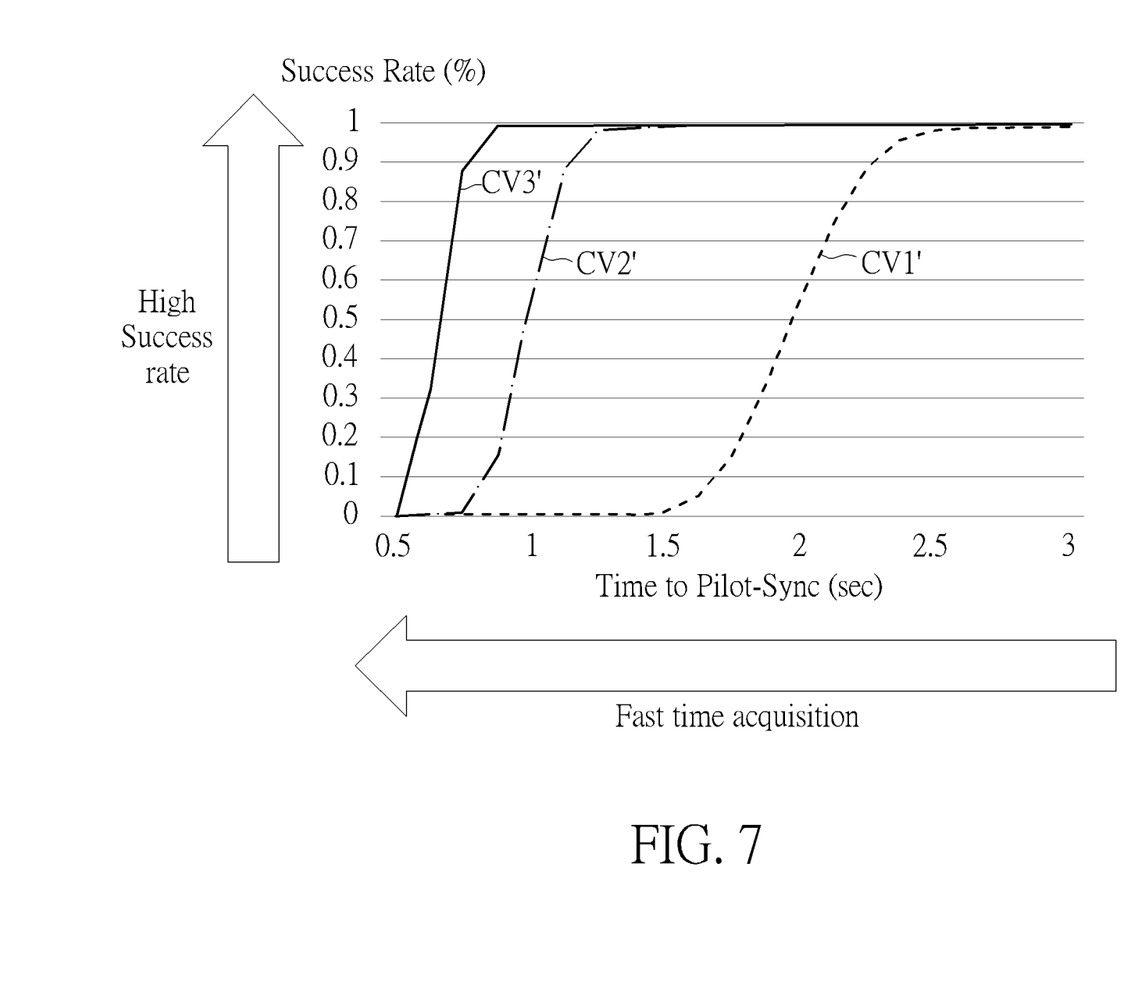
FIG. 7 is a diagram illustrating relationship between success rate and time to pilot-synchronization under 21 dBHz for different secondary code detection conditions.

FIG. 7 is a diagram illustrating relationship between success rate and time to pilot-synchronization under 21 dBHz for different secondary code detection conditions, where the X-axis is indicative of time to pilot-synchronization expressed in second, and the Y-axis is indicative of success rate expressed in percentage. The characteristic curve CV1' illustrates the relationship between success rate and time to pilot-synchronization under a condition that the secondary code detection is performed by using only one signal according to the conventional method. The characteristic curve CV2' illustrates the relationship between success rate and time to pilot-synchronization under a condition that the secondary code detection is performed by jointly considering two satellite signals according the proposed joint pilot detection method. The characteristic curve CV3' illustrates the relationship between success rate and time to pilot-synchronization under a condition that the secondary code detection is performed by jointly considering three satellite signals according the proposed joint pilot detection method. As can be seen from FIG. 7, the proposed joint pilot detection method can achieve fast time acquisition as well as high success rate compared to the conventional method.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A joint pilot detection method comprising:
    obtaining a plurality of input signals that are derived from a plurality of satellite signals transmitted from a plurality of global navigation satellite system (GNSS) satellites, respectively, wherein each of the plurality of satellite signals carries a pilot component that is dataless and modulated by a primary code and a secondary code;
    obtaining a plurality of code sequences that are replicas of secondary codes of the plurality of satellites, respectively;
    performing a plurality of correlation operations according to the plurality of input signals and the plurality of code sequences, for generating a plurality of correlation results, respectively; and
    performing pilot detection by jointly considering the plurality of correlation results.

2. The joint pilot detection method of claim 1, wherein performing the pilot detection by jointly considering the plurality of correlation results comprises:
    performing coherent combination according to the plurality of correlation results, to generate a combination result; and
    performing the pilot detection according to the combination result.

3. The joint pilot detection method of claim 2, wherein performing the coherent combination according to the plurality of correlation results comprises:
    before combining the plurality of correlation results to generate the combination result, performing inter-satellite time of arrival (TOA) offset calibration upon the plurality of correlation results.

4. The joint pilot detection method of claim 1, wherein performing the pilot detection by jointly considering the plurality of correlation results comprises:
    performing non-coherent combination according to the plurality of correlation results, to generate a combination result; and
    performing the pilot detection according to the combination result.

5. The joint pilot detection method of claim 4, wherein performing the non-coherent combination according to the plurality of correlation results comprises:
    generating a plurality of mathematical manipulation values of the plurality of correlation results, respectively; and
    performing the non-coherent combination according to the plurality of mathematical manipulation values.

6. The joint pilot detection method of claim 5, wherein performing the non-coherent combination according to the plurality of mathematical manipulation values comprises:
    before combining the plurality of mathematical manipulation values to generate the combination result, performing inter-satellite time of arrival (TOA) offset calibration upon the plurality of mathematical manipulation values.

7. The joint pilot detection method of claim 1, wherein performing the pilot detection by jointly considering the plurality of correlation results comprises:
    performing majority voting according to the plurality of correlation results, to generate a majority voting result; and
    performing the pilot detection according to the majority voting result.

8. The joint pilot detection method of claim 7, wherein performing the majority voting according to the plurality of correlation results comprises:
    generating a plurality of mathematical manipulation values of the plurality of correlation results, respectively;
    for each of the plurality of mathematical manipulation values, checking if the mathematical manipulation value is larger than a predetermined threshold; and
    performing the majority voting according to selected mathematical manipulation values, wherein each of the selected mathematical manipulation values is one of the plurality of mathematical manipulation values that is larger than the predetermined threshold.

9. The joint pilot detection method of claim 8, wherein performing the majority voting according to the selected mathematical manipulation values comprises:
    obtaining GNSS aided data; and
    before performing the majority voting upon the selected mathematical manipulation values, performing inter-satellite time of arrival (TOA) offset calibration upon the selected mathematical manipulation values according to the GNSS aided data.

10. The joint pilot detection method of claim 1, wherein the plurality of satellite signals comprise multiple GPS L1C signals, or comprise multiple BeiDou B1C signals, or comprise at least one GPS L1C signal and at least one BeiDou B1C.

11. A joint pilot detection apparatus comprising:
    a correlation circuit, arranged to:
        obtain a plurality of input signals that are derived from a plurality of satellite signals transmitted from a plurality of global navigation satellite system (GNSS) satellites, respectively, wherein each of the plurality of satellite signals carries a pilot component that is dataless and modulated by a primary code and a secondary code;

obtain a plurality of code sequences that are replicas of secondary codes of the plurality of satellites, respectively; and perform a plurality of correlation operations according to the plurality of input signals and the plurality of code sequences, for generating a plurality of correlation results, respectively; and a joint pilot detection circuit, arranged to perform pilot detection by jointly considering the plurality of correlation results.

12. The joint pilot detection apparatus of claim 11, wherein the joint pilot detection circuit comprises:

a combining circuit, arranged to perform coherent combination according to the plurality of correlation results, to generate a combination result; and a judgment circuit, arranged to perform the pilot detection according to the combination result.

13. The joint pilot detection apparatus of claim 12, wherein the combining circuit comprises:

an accumulator circuit, arranged to generate the combination result; and an inter-satellite time of arrival (TOA) offset calibration circuit, arranged to perform inter-satellite TOA offset calibration upon the plurality of correlation results before the accumulator circuit combines the plurality of correlation results to generate the combination result.

14. The joint pilot detection apparatus of claim 11, wherein the joint pilot detection circuit comprises:

a combining circuit, arranged to perform non-coherent combination according to the plurality of correlation results, to generate a combination result; and a judgment circuit, arranged to perform the pilot detection according to the combination result.

15. The joint pilot detection apparatus of claim 14, wherein the combining circuit comprises:

a mathematical manipulation circuit, arranged to generate a plurality of mathematical manipulation values of the plurality of correlation results, respectively; and an accumulator circuit, arranged to generate the combination result according to the plurality of mathematical manipulation values.

16. The joint pilot detection apparatus of claim 15, wherein the combining circuit further comprises:

an inter-satellite time of arrival (TOA) offset calibration circuit, arranged to perform inter-satellite TOA offset calibration upon the plurality of mathematical manipulation values before the accumulator circuit combines the plurality of mathematical manipulation values to generate the combination result.

17. The joint pilot detection apparatus of claim 11, wherein the joint pilot detection circuit comprises:

a processing circuit, arranged to perform majority voting according to the plurality of correlation results, to generate a majority voting result; and a judgment circuit, arranged to perform the pilot detection according to the majority voting result.

18. The joint pilot detection apparatus of claim 17, wherein the processing circuit comprises:

a mathematical manipulation circuit, arranged to generate a plurality of mathematical manipulation values of the plurality of correlation results, respectively;

a checking circuit, wherein for each of the plurality of mathematical manipulation values, the checking circuit is arranged to check if the mathematical manipulation value is larger than a predetermined threshold; and a majority voting circuit, arranged to perform the majority voting according to selected mathematical manipulation values, wherein each of the selected mathematical manipulation values is one of the plurality of mathematical manipulation values that is larger than the predetermined threshold.

19. The joint pilot detection apparatus of claim 18, wherein the processing circuit further comprises:

an inter-satellite time of arrival (TOA) offset calibration circuit, arranged to obtain GNSS aided data, and further arranged to perform inter-satellite TOA offset calibration upon the selected mathematical manipulation values according to the GNSS aided data before the majority voting circuit performs the majority voting upon the selected mathematical manipulation values.

20. The joint pilot detection apparatus of claim 11, wherein the plurality of satellite signals comprise multiple GPS L1C signals, or comprise multiple BeiDou B1C signals, or comprise at least one GPS L1C signal and at least one BeiDou B1C.

* * * * *